(12) United States Patent
Tanaka

(10) Patent No.: US 8,836,760 B2
(45) Date of Patent: Sep. 16, 2014

(54) IMAGE REPRODUCING APPARATUS, IMAGE CAPTURING APPARATUS, AND CONTROL METHOD THEREFOR

(75) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/813,101

(22) Filed: Jun. 10, 2010

(65) Prior Publication Data

US 2010/0328432 A1 Dec. 30, 2010

(30) Foreign Application Priority Data

Jun. 26, 2009 (JP) ................................. 2009-152876

(51) Int. Cl.
*H04N 13/02* (2006.01)
*H04N 13/00* (2006.01)
*H04N 5/232* (2006.01)

(52) U.S. Cl.
CPC ........... *H04N 13/007* (2013.01); *H04N 13/004* (2013.01); *H04N 13/0239* (2013.01); *H04N 2013/0081* (2013.01); *H04N 5/23219* (2013.01)
USPC ................... 348/46; 348/51; 348/43; 348/42; 348/49; 348/50

(58) Field of Classification Search
USPC .............................. 348/46, 51, 43, 42, 49, 50
See application file for complete search history.

(56) References Cited

U.S. PATENT DOCUMENTS

| | | | | |
|---|---|---|---|---|
| 5,379,369 A | * | 1/1995 | Komma et al. ................ | 345/419 |
| 5,737,012 A | * | 4/1998 | Tabata et al. .................... | 348/53 |
| 5,929,859 A | * | 7/1999 | Meijers ......................... | 345/419 |
| 8,059,939 B2 | * | 11/2011 | Sasaki et al. ................... | 386/284 |
| 8,384,767 B2 | * | 2/2013 | Iwasaki ........................... | 348/47 |
| 2002/0008906 A1 | | 1/2002 | Tomita | |
| 2011/0141234 A1 | * | 6/2011 | Tsukagoshi ..................... | 348/43 |

FOREIGN PATENT DOCUMENTS

| | | |
|---|---|---|
| JP | 63-167594 A | 7/1988 |
| JP | 10-327430 A | 12/1998 |
| JP | 11-155154 A | 6/1999 |
| JP | 11-289555 | 10/1999 |

(Continued)

OTHER PUBLICATIONS

Yukiko Soga, et al, "A study of superimposed characters on stereoscopic images", ITE Technical Report, ITE, Jan. 28, 2005, vol. 29, No. 6, pp. 43-46.

(Continued)

*Primary Examiner* — Shawn An
(74) *Attorney, Agent, or Firm* — Cowan, Liebowitz & Latman, P.C.

(57) ABSTRACT

An image reproducing apparatus for reproducing a stereoscopic image shot by a stereoscopic image capturing apparatus, the image reproducing apparatus comprises: an input unit which inputs image data of the stereoscopic image and additional data recorded in association with the image data; an acquisition unit which acquires depth information indicating a depth of a point of interest in the stereoscopic image set, during shooting, on the basis of the additional data; a generation unit which generates images to be superimposed on right and left images of the stereoscopic image, the images to be superimposed having parallax corresponding to the depth indicated by the depth information, on the basis of the depth information; and a display output unit which combines the right and left images of the stereoscopic image with the images to be superimposed, and outputs the combined right and left images of the stereoscopic image to a display apparatus.

6 Claims, 16 Drawing Sheets

(56) References Cited

FOREIGN PATENT DOCUMENTS

| | | |
|---|---|---|
| JP | 2001-326947 | 11/2001 |
| JP | 2004-242000 A | 8/2004 |
| JP | 2004-274125 A | 9/2004 |
| JP | 2006-325165 | 11/2006 |
| JP | 2009-053748 A | 3/2009 |
| JP | 2009-129420 A | 6/2009 |
| JP | 2010-056737 A | 3/2010 |

OTHER PUBLICATIONS

Sep. 20, 2013 Japanese Office Action, without an English Translation, that issued in Japanese Patent Application No. 2009-152876.
The above foreign patent document was cited in a Jun. 6, 2014 Japanese Office Action, a copy of which is enclosed without an English Translation, that issued in Japanese Patent Application No. 2009-152876.

* cited by examiner

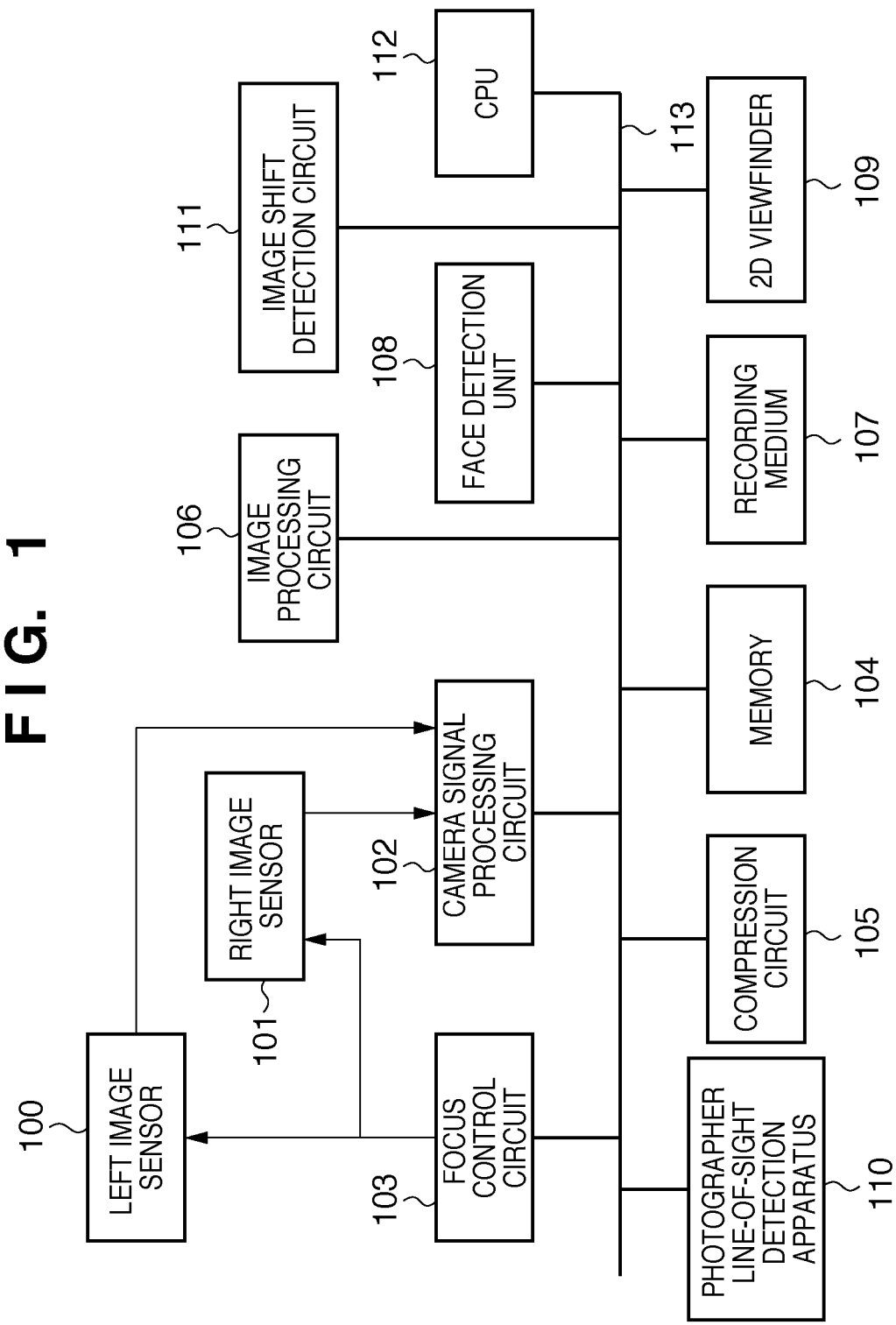

DIFFERENCE BETWEEN RIGHT AND LEFT

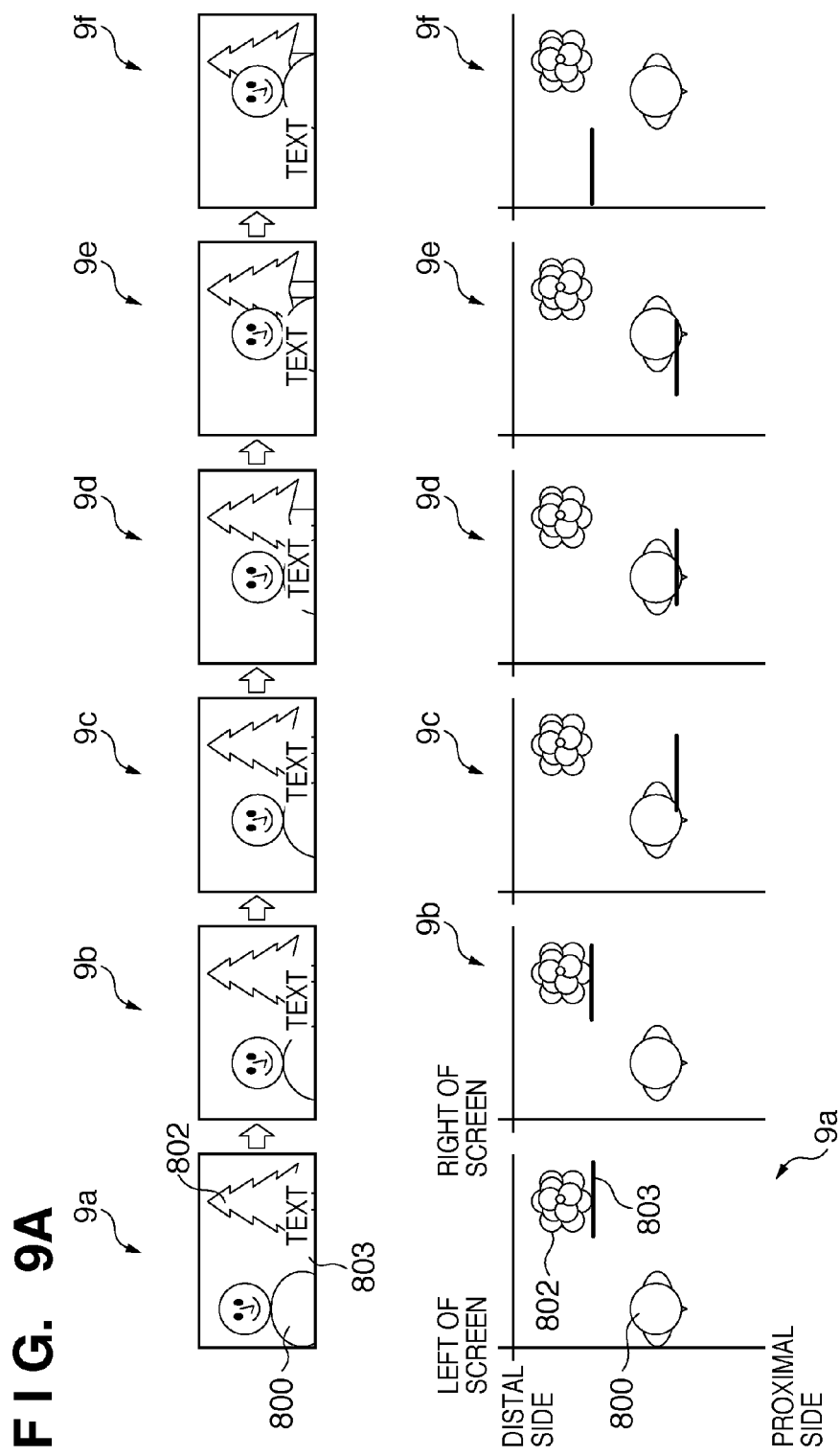

IMAGE REPRODUCING APPARATUS, IMAGE CAPTURING APPARATUS, AND CONTROL METHOD THEREFOR

BACKGROUND OF THE INVENTION

1. Field of the Invention

The present invention relates to a technology for setting the depth of a stereoscopic image to be inserted into another image.

2. Description of the Related Art

With the development of high-definition displays, larger and digitized, home televisions and head-mounted displays capable of 3D-display have been commercialized. Further, a technology that superimposes texts and images (referred to as "text", hereinafter) on a 3D-displayed image (stereoscopic image) has been proposed as well.

In a case in which a text is superimposed on a stereoscopic image, if the difference between the depth with which a subject that is the subject of the gaze is displayed and the depth with which the text is displayed is great, people looking at the images are forced to make large shifts in focus, tiring their eyes. Alternatively, they may not even notice that a text is there. Therefore, for example, in a situation in which, while reproducing a stereoscopic image shot with a home video camera, it is desired to superimpose an externally generated emergency report text onto the stereoscopic image, it is important to synthesize in real time a text with parallax such that there is no difference in depth perception between the text and the subject of the gaze.

In Japanese Patent Laid-Open No. 2006-325165 (page 8, FIG. 1), a text generating device is proposed that, when an object in the depth of a text that one wishes to attach during editing is specified, obtains depth information and parallax information at coordinates of the specified object to give the text the necessary parallax.

In Japanese Patent Laid-Open No. 11-289555 (page 8, FIG. 6), a stereoscopic image display device is proposed that stereoscopically displays character information accompanying stereoscopic image information for broadcasted 3D-display near the relevant speaker in the image.

However, the technology of Japanese Patent Laid-Open No. 2006-325165 has a drawback in that, because editing must be carried out in advance and the object specified using a joystick or other such manual operation, the edited object cannot be synthesized with the reproduced image in real time.

Also, the technology of Japanese Patent Laid-Open No. 11-289555 has a drawback in that, if the subject of interest is not emitting sound, the depth of display of the character information cannot be matched with the depth of the subject.

SUMMARY OF THE INVENTION

The present invention has been made in consideration of the above situation, and automatically displays, at an easy-to-look-at depth, an image other than a stereoscopic image when that image is superimposed on the stereoscopic image.

According to one aspect of the present invention, there is provided an image reproducing apparatus for reproducing a stereoscopic image shot by a stereoscopic image capturing apparatus, the image reproducing apparatus comprising: an input unit configured to input image data of the stereoscopic image and additional data recorded in association with the image data; an acquisition unit configured to acquire depth information indicating a depth of a point of interest in the stereoscopic image set, during shooting, on the basis of the additional data input by the input unit; a generation unit configured to generate images to be superimposed on right and left images of the stereoscopic image, the images to be superimposed having parallax corresponding to the depth indicated by the depth information, on the basis of the depth information acquired by the acquisition unit; and a display output unit configured to combine the right and left images of the stereoscopic image of the image data input by the input unit with the images to be superimposed, which are generated by the generation unit, and output the combined right and left images of the stereoscopic image to a display apparatus.

According to another aspect of the present invention, there is provided an image capturing apparatus comprising: an image capturing unit configured to shoot a stereoscopic image; a detection unit configured to detect a depth of a point of interest in the stereoscopic image set during shooting carried out by the image capturing apparatus; a recording unit configured to record, on a recording medium, image data of the stereoscopic image shot by the image capturing apparatus and depth information indicating the depth of the point of interest detected by the detection unit; a reading unit configured to read the image data and the depth information recorded on the recording medium; a generation unit configured to generate images to be superimposed on right and left images of a reproduced stereoscopic image of the image data read in the reading step, the images to be superimposed having parallax corresponding to the depth indicated by the depth information, on the basis of the depth information read by the reading unit; and a display output unit configured to combine the right and left images of the stereoscopic image of the image data read by the reading unit with the images to be superimposed, which are generated by the generation unit, and output the combined right and left images of the stereoscopic image to a display apparatus.

According to still another aspect of the present invention, there is provided a control method for an image reproducing apparatus for reproducing a stereoscopic image shot by a stereoscopic image capturing apparatus, the control method comprising: an input step of inputting image data of the stereoscopic image and additional data recorded in association with the image data; an acquisition step of acquiring depth information indicating a depth of a point of interest in the stereoscopic image set, during shooting, on the basis of the additional data input in the input step; a generation step of generating images to be superimposed on right and left images of the stereoscopic image, the images to be superimposed having parallax corresponding to the depth indicated by the depth information, on the basis of the depth information acquired in the acquisition step; and a display step of combining the right and left images of the stereoscopic image of the image data input in the input step with the images to be superimposed, which are generated in the generation step, and displaying the combined right and left images of the stereoscopic image on a display apparatus.

According to yet another aspect of the present invention, there is provided a control method for an image capturing apparatus for shooting a stereoscopic image, the control method comprising: an image capturing step of shooting a stereoscopic image; a detection step of detecting a depth of a point of interest in the stereoscopic image set during shooting in the image capturing step; a recording step of recording, on a recording medium, image data of the stereoscopic image shot in the image capturing step and depth information indicating the depth of the point of interest detected in the detection step; a reading step of reading the image data and the depth information recorded on the recording medium; a generation step of generating images to be superimposed on right and left images of a reproduced stereoscopic image of the image data read in the reading step, the images to be superimposed having parallax corresponding to the depth indicated by the depth information, on the basis of the depth information read in the reading step; and a display step of combining the right and left images of the stereoscopic image of the image data read in the reading step with the images to be superimposed, which are generated in the generation step, and outputting the combined right and left images of the stereoscopic image to a display apparatus.

According to still yet another aspect of the present invention, there is provided a control method for a system in which an image capturing apparatus shoots a stereoscopic image and an image reproducing apparatus reproduces the shot stereoscopic image, wherein the image capturing apparatus carries out: an image capturing step of shooting a stereoscopic image; a detection step of detecting a depth of a point of interest in the stereoscopic image set during shooting in the image capturing step; and a recording step of recording, on a recording medium, image data of the stereoscopic image shot in the image capturing step and depth information indicating the depth of the point of interest detected in the detection step, and wherein the image reproducing apparatus carries out: an input step of inputting the image data of the stereoscopic image and the depth information; an acquisition step of acquiring the depth information indicating a depth of a point of interest in the stereoscopic image set during shooting, on the basis of the depth information input in the input step; a generation step of generating images to be superimposed on right and left images of the stereoscopic image, the images to be superimposed having parallax corresponding to the depth indicated by the depth information, on the basis of the depth information acquired in the acquisition step; and a display step of combining the right and left images of the stereoscopic image of the image data input in the input step with the images to be superimposed, which are generated in the generation step, and displaying the combined right and left image of the stereoscopic image on a display apparatus.

Further features of the present invention will become apparent from the following description of exemplary embodiments (with reference to the attached drawings).

BRIEF DESCRIPTION OF THE DRAWINGS

FIG. 1 is a block diagram illustrating the configuration of an image capturing apparatus according to an embodiment of the present invention;

FIGS. 9A and 9B are diagrams illustrating another example of displaying a stereoscopic image in the first embodiment of the present invention;

DESCRIPTION OF THE EMBODIMENTS

Figure 2A:
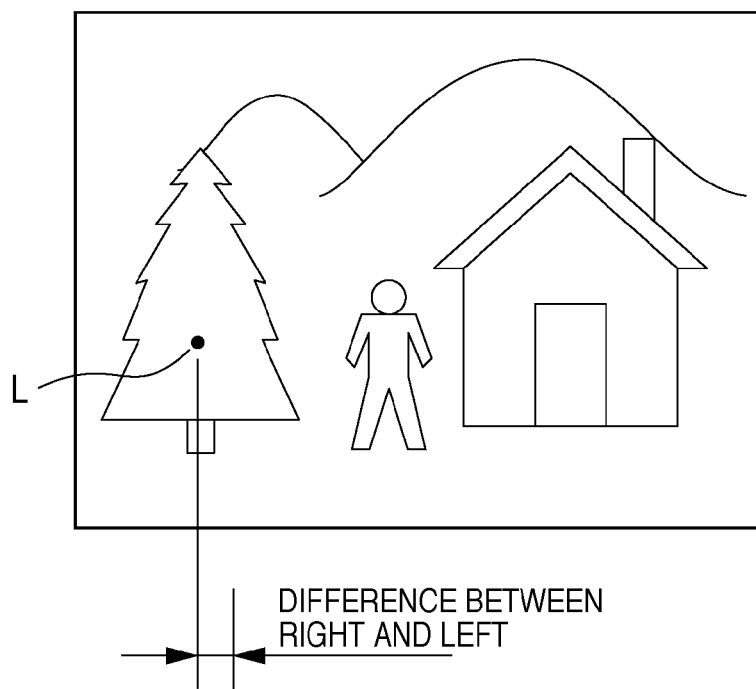
FIGS. 2A and 2B are diagrams for explaining parallax between a left image and a right image of a stereoscopic image.

Preferred embodiments of the present invention will be described in detail in accordance with the accompanying drawings.

First Embodiment

FIG. 1 is a block diagram illustrating the configuration of an image capturing apparatus according to an embodiment of the present invention, which is capable of capturing stereoscopic images.

In FIG. 1, reference numeral 100 denotes a left image sensor composed of an image sensor (for example, a CMOS sensor) for shooting a left image of a stereoscopic image, and reference numeral 101 denotes a right image sensor also composed of a CMOS sensor or the like for shooting a right image thereof. Subject optical images formed on the left image sensor 100 and the right image sensor 101 are subjected to photoelectric conversion, and respectively output as left image signals and right image signals (image data) from a camera signal processing circuit 102.

The image signals output from the camera signal processing circuit 102 are input to a focus control circuit 103, in which an autofocus (AF) evaluation value is calculated. On the other hand, distance information is output from a distance sensor (not shown) for AF, and output to the focus control circuit 103. The focus control circuit 103 exercises automatic focus (AF) control on the basis of the distance information and the AF evaluation value, and outputs focus information to a CPU 112.

The image signals output from the camera signal processing circuit 102 are temporarily stored in a memory 104, encoded by a compression circuit 105, and recorded on a recording medium 107. In parallel with the compression and recording process, the image signals accumulated in the memory 104 are subjected to resizing to an optimum size in an image processing circuit 106, and displayed on a 2D viewfinder 109 with a face frame or the like superimposed thereon, thereby feeding back images shot in real time to the photographer. It is to be noted that the image shot by either the left image sensor 100 or the right image sensor 101 is displayed on the 2D viewfinder.

A face detection unit 108 detects a face from the image shot by either the left image sensor 100 or the right image sensor 101, and outputs to the CPU 112, face detection information such as the position and size of the detected face, the number of faces, and the reliability (certainty) for the face. It is to be noted that the detection of a face can be carried out by a known method, for example, by comparison with a database image stored in advance within the face detection unit 108 in accordance with template matching or the like. The CPU 112 is able to determine the subject position on the basis of the position and size of the face and the reliability, which are input from the face detection unit 108, to exercise focus control and specify the point to be subjected to photometry in the screen.

A photographer line-of-sight detection apparatus 110, which is mounted near the 2D view finder 109, detects which point of the angle of view for a displayed image is gazed by the photographer and outputs, to the CPU 112, shooting line-of-sight point information indicating the gaze point. It is to be noted that the line-of-sight detection technique is known, and detailed description of the technique will be thus omitted.

Reference numeral 111 denotes an image shift detection circuit for detecting the shift amount between a left image and a right image at a specific point, which outputs the detected shift amount (parallax information) to the CPU 112. This shift between the right and left images at the specific point corresponds to the depth of the stereoscopic image at the specific point, and is treated as information regarding the depth.

The CPU 112 and each block are connected to each other via a bus 113, and each block is controlled in accordance with a program in the CPU 112. Furthermore, the CPU 112 associates parallax information on a shooting line-of-sight point, parallax information on an in-focus point, and parallax information on a face detection point with image signals, and records the parallax information on the recording medium 107.

Figure 2B:
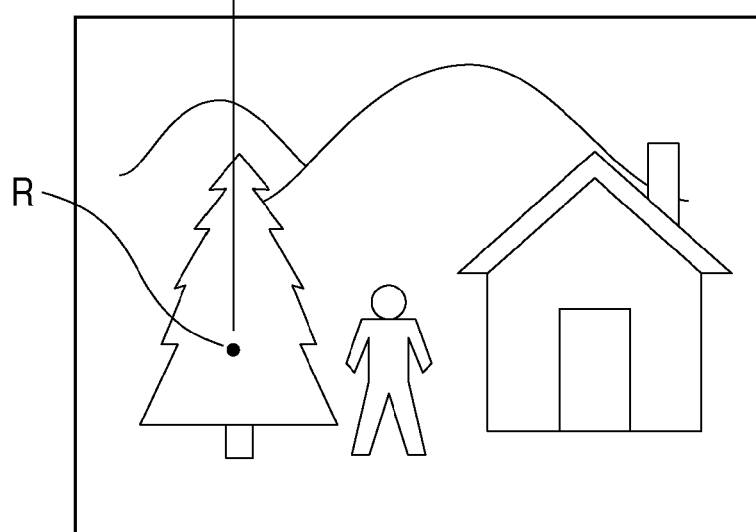

FIGS. 2A and 2B are diagrams for explaining the operation of the image shift detection circuit 111 for detecting the shift amount (parallax information) between a left image and a right image. FIG. 2A is a left image whereas FIG. 2B is a right image. When the right image is shifted with respect to the left image around a point of interest L in the left image, the point of matching between the eight and left images is denoted by R in the right image, and the shifting amount (shift amount) results in parallax, which is obtained as the difference between the right and left images required for determining the depth.

Figure 3A:
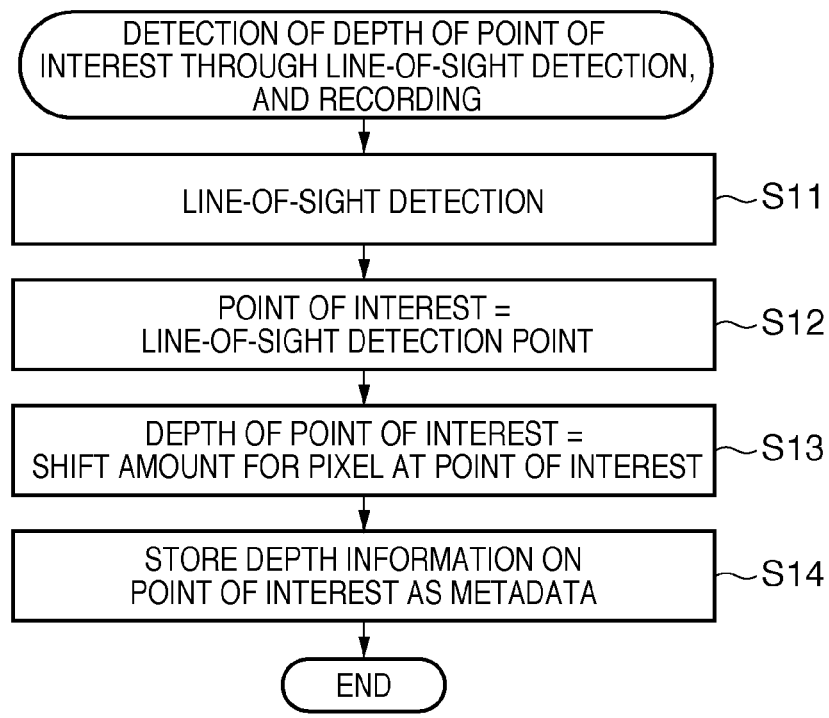
FIGS. 3A and 3B are flowcharts for detection of the depth of a point of interest and processing for recording in a first embodiment of the present invention.

FIG. 3A is a flowchart showing the determination of a point of interest and the detection of the depth with the use of the line-of-sight detection carried out by the photographer line-of-sight detection apparatus 110, as well as processing for recording. The depth detection is carried out by the CPU 112.

First, the photographer line-of-sight detection apparatus 110 detects the line of sight of the photographer looking into the 2D view finder 109 (step S11), and the destination of the detected line of sight is regarded as a point of interest (step S12). Then, as shown in FIGS. 2A and 2B, the image shift detection circuit 111 for detecting the shift between a left image and a right image detects, as depth information on the point of interest, the shift amount for the pixel at the point of interest (step S13). The detected depth information on the point of interest is recorded on the recording medium 107 as metadata simultaneously associated with image signals (step S14), and then the processing is ended.

In the processing shown in FIG. 3A, the depth is obtained with the point gazed by the photographer as a point of interest through the line-of-sight detection. Thus, as described below, text can be inserted during reproduction at the depth of a subject gazed by the photographer, thereby allowing for easily viewable display.

Figure 3B:
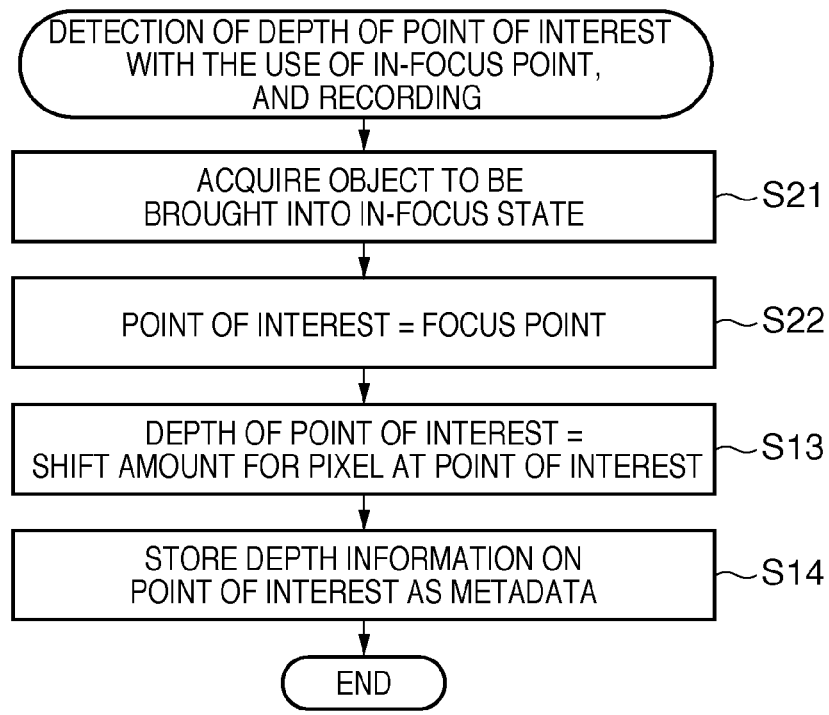

FIG. 3B is a flowchart showing the determination of a point of interest and the detection of the depth with the use of an in-focus point, as well as processing for recording. The depth detection is carried out by the CPU 112. In FIG. 3B, the focus point of a lens is obtained from focus information output from the focus control circuit 103 (step S21), and the obtained focus point is regarded as a point of interest (step S22). Since the subsequent processing is the same as in the case of FIG. 3A, the same step numbers are assigned, and description of the subsequent processing will be omitted here.

In the processing shown in FIG. 3B, for example, in such a situation a shooting an observation video, the depth is obtained with the focus point as a point of interest in a case in which the composition is determined so that a main subject is brought into the in-focus point in an autofocus mode or in which shooting is carried out with a main subject as an object to be brought into an in-focus state in a manual focus mode. Therefore, as described below, text can be inserted during reproduction at the depth of a subject in an in-focus state, thereby allowing for easily viewable display.

Figure 4:
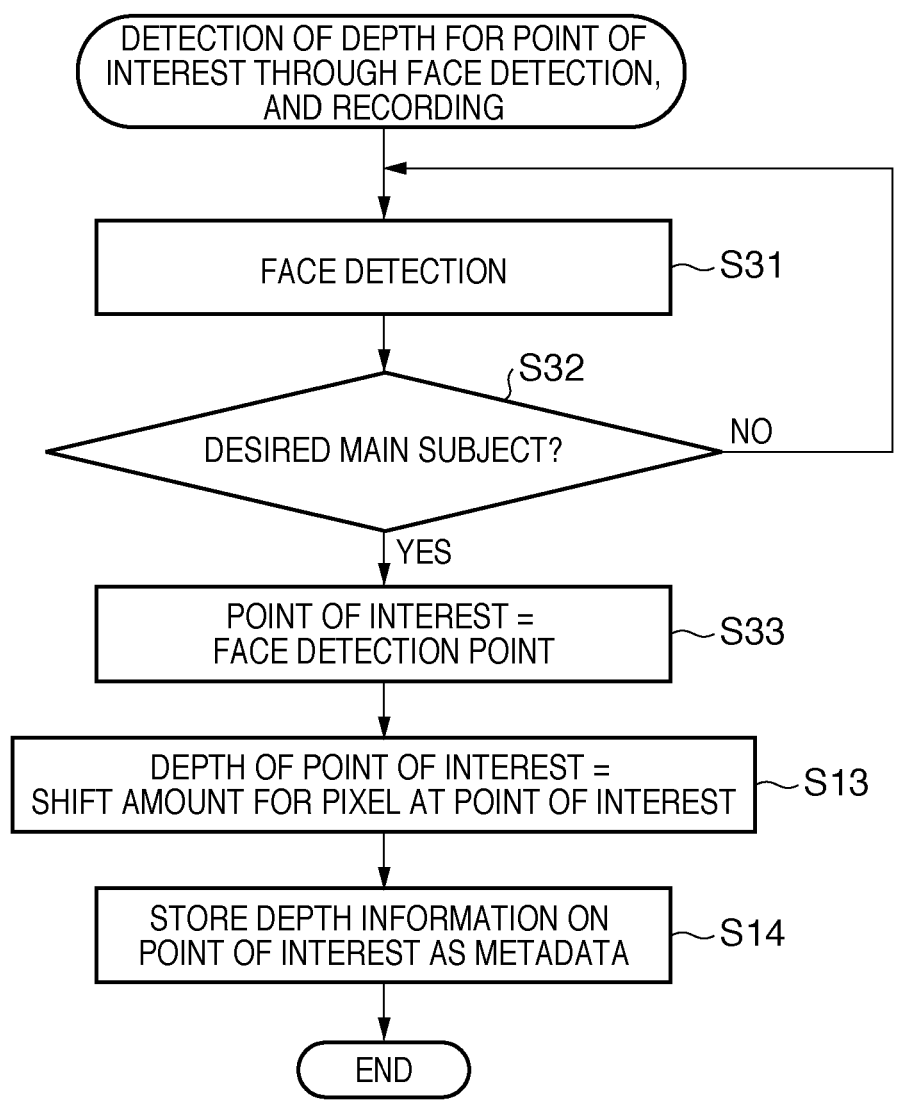
FIG. 4 is another flowchart for detection of the depth of a point of interest and processing for recording in the first embodiment of the present invention.

FIG. 4 is a flowchart for determination of a point of interest and detection of the depth thereof through face detection carried out by the face detection unit 108, as well as processing for recording. The depth detection is carried out by the CPU 112. In FIG. 4, first, the face detection unit 108 carries out face detection (step S31), and the CPU 112 checks with the photographer if the detected face is a desired main subject or not from the obtained face detection information (step S32). If the detected face is not the desired main subject, the processing is returned to step S31 to repeat the face detection. This operation allows the photographer to repeat the selection until the desired main subject is detected. Alternatively, if the detected face is the desired main subject, the face detection point based on the face detection information is regarded as a point of interest (step S33). The subsequent processing is the same as in the case of FIG. 3A, the same step numbers are assigned, and description of the subsequent processing will be omitted here.

In the processing shown in FIG. 4, for example, in such as situation as shooting a video in a gathering place for a lot of people, in a case in which a desired face is detected, the depth is obtained with the detection point of the face as a point of interest. Therefore, as described below, text can be inserted during reproduction at the depth of the desired face, thereby allowing for easily viewable display.

It is to be noted that while one face is detected to obtain the depth of the point of interest in the example described with reference to FIG. 4, the depths of points of interest for multiple faces may be recorded.

Figure 5:
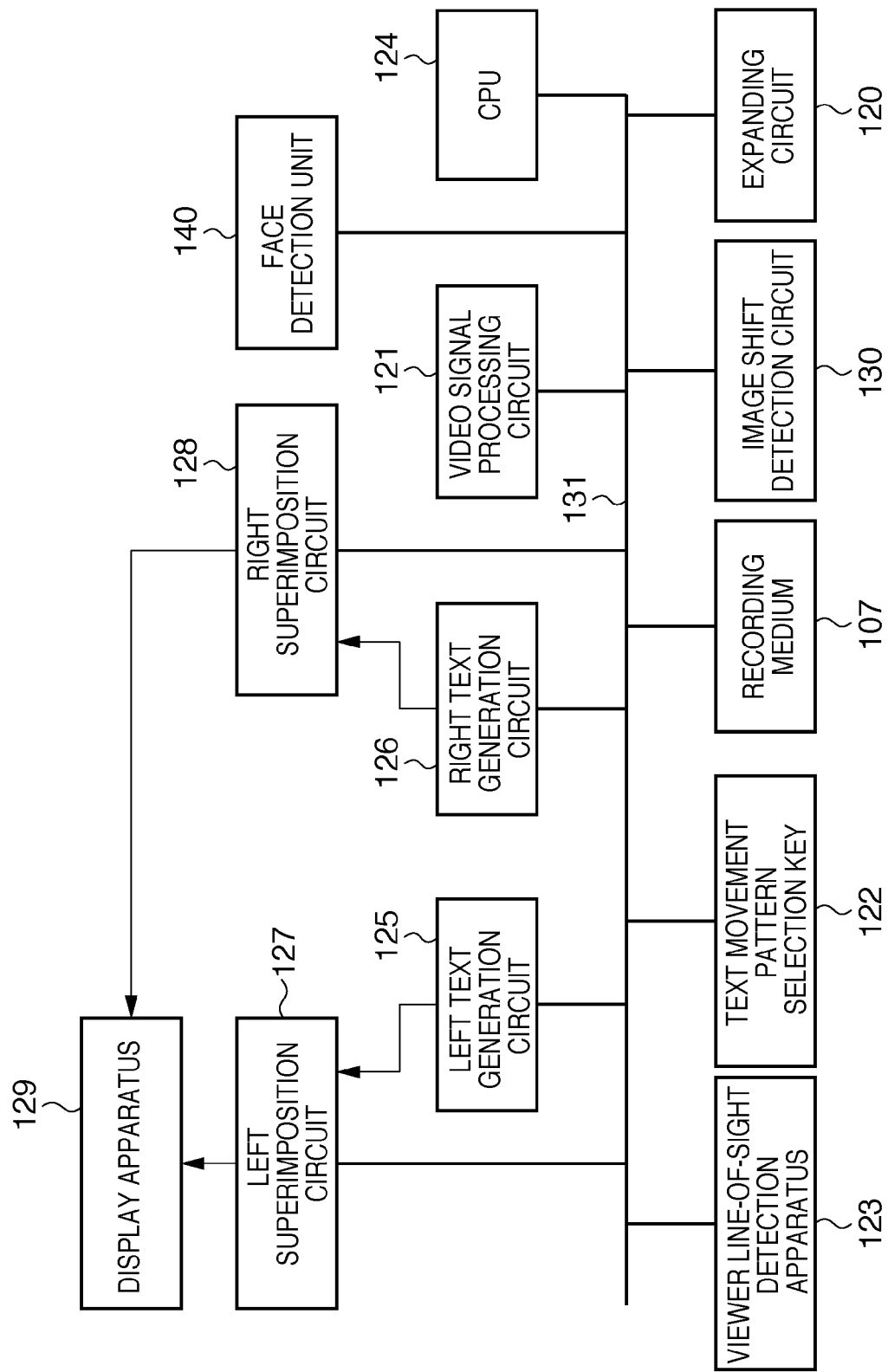
FIG. 5 is a block diagram illustrating the configuration of an image reproducing apparatus according to an embodiment of the present invention.

FIG. 5 is a block diagram illustrating the configuration of an image reproducing apparatus according to the first embodiment, which is capable of reproducing stereoscopic images. It is to be noted that a recording medium 107 is the same as the recording medium 107 in FIG. 1.

Image data read out from the recording medium 107 and input is decoded by an expanding circuit 120, and input to a video signal processing circuit 121. The video signal processing circuit 121 respectively reproduces a left image and a right image, and respectively outputs the left and right images to a left superimposition circuit 127 and a right superimposition circuit 128.

A text movement pattern selection key 122 is provided to allow the viewer to select any one of multiple patterns (movement patterns) regarding the depth at which a text is displayed, which outputs a selection signal corresponding to the selected movement pattern to the CPU 124. As the movement patterns, the following three patterns are considered in the first embodiment. The first pattern refers to a pattern in which a text is always displayed at the same depth as the depth of a point of interest. The second pattern refers to a pattern in which a text is displayed at a depth in front of a subject in a case in which the lateral display point of the text on the screen is the same as the lateral display point of the subject at a point of interest on the screen. Furthermore, the third pattern refers to a pattern in which a text is displayed at the same depth as that of a subject only in a case in which the lateral display point of the text on the screen is the same as that of the subject at the point of interest. It is to be noted that the present invention is not to be considered limited to the movement patterns described above.

Reference numeral 123 denotes a viewer line-of-sight detection apparatus, which detects which point of a display apparatus 129 is gazed by the viewer, and outputs the viewing line-of-sight point information to the CPU 124. It is to be noted that the line-of-sight detection technique is known, and detailed description of the technique will be thus omitted.

Furthermore, reference numeral 140 denotes a face detection unit, which compares a reproduced image with a database image stored in advance within the face detection unit 140 in accordance with template matching or the like, and outputs to the CPU 124, face detection information such as the position and size of the face of a detected subject, the number of faces, and the reliability (certainty) for the face.

A left text generation circuit 125 generates, on the basis of a depth for insertion, a text for a left eye, which has predetermined parallax with respect to a text for a right eye, and outputs the text to the left superimposition circuit 127. Then, the left superimposition circuit 127 inserts the text for a left eye output from the left text generation circuit 125, into the left image output from the video signal processing circuit 121, and outputs to the display apparatus 129, the left image with the text inserted.

Similarly, a right text generation circuit 126 generates, on the basis of a depth for insertion, a text for a right eye, which has predetermined parallax with respect to the text for a left eye, and outputs the text to the right superimposition circuit 128. Then, the right superimposition circuit 128 inserts the text for a right eye output from the right text generation circuit 126, into the right image output from the video signal processing circuit 121, and outputs to the display apparatus 129, the right image with the text inserted.

The display apparatus 129 3D-displays the left image output from the left superimposition circuit 127 and the right image output from the right superimposition circuit 128, and displays the texts inserted at the predetermined depth.

Reference numeral 130 denotes an image shift detection circuit for detecting the shift between a left image and a right image, which detects the shift amount and outputs the shift amount to the CPU 124.

The CPU 124 and each block are connected to each other via a bus 131, and each block is controlled in accordance with a program in the CPU 124. The present invention can be applied in conjunction with a stationary display, a head-mounted display, or the like as the display apparatus 129, regardless of the type of display apparatus.

Figure 6:
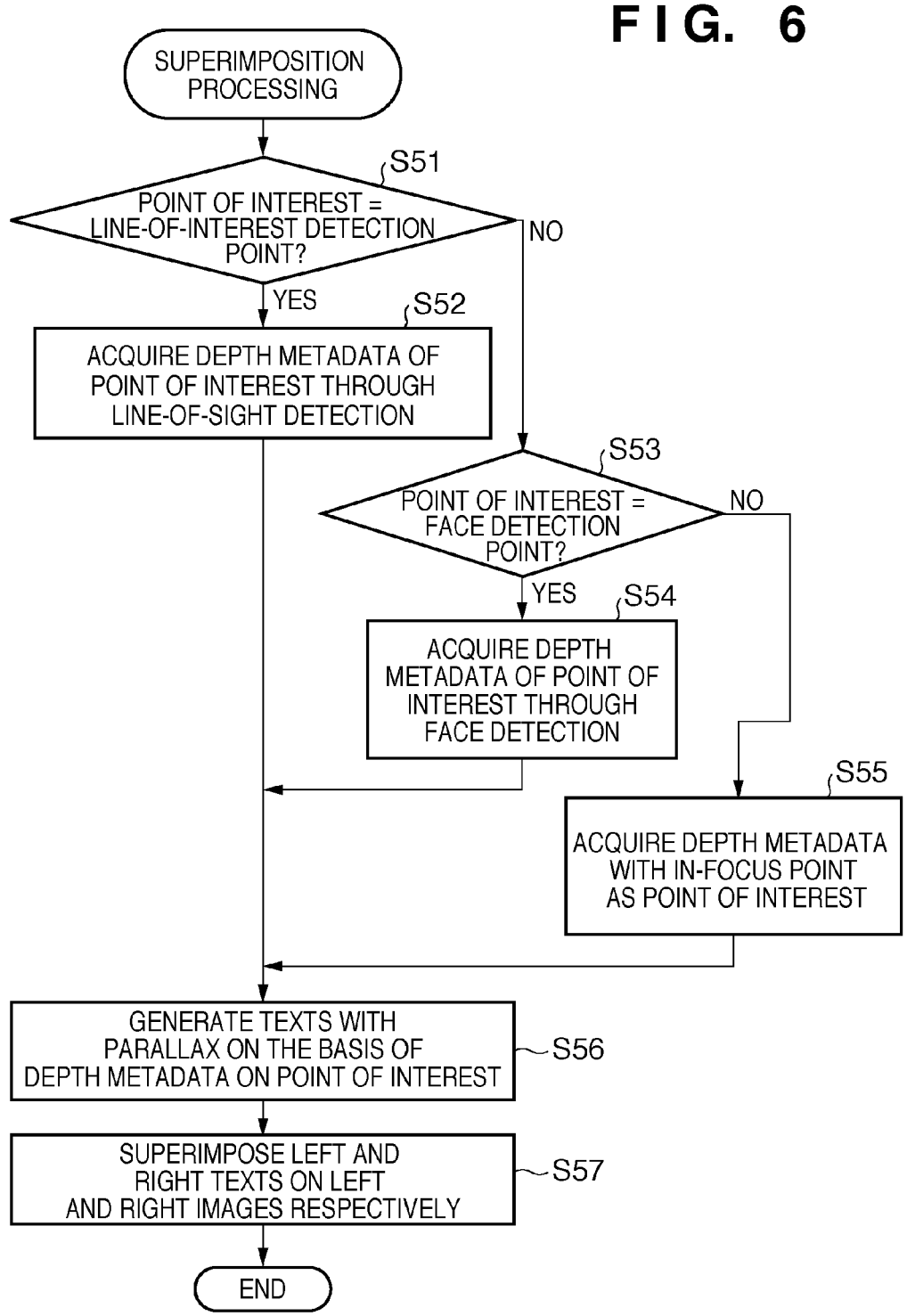
FIG. 6 is a flowchart showing text superimposition processing in the first embodiment of the present invention.

FIG. 6 is a flowchart showing text superimposition processing in the image reproducing apparatus according to the first embodiment.

First, it is checked with the viewer if a line-of-sight detection point during shooting is regarded as a point of interest or not (step S51), and if the line-of-sight detection point is regarded as a point of interest, the processing proceeds to step S52, or if not, the processing proceeds to step S53. In step S52, depth metadata of the point of interest obtained through the line-of-sight detection, stored in step S14 of FIG. 3A, is acquired to proceed to step S56. On the other hand, in step S53, it is checked if a face detection point during shooting is regarded as a point of interest or not, and if the face detection point is regarded as a point of interest, the processing proceeds to step S54, or if not, the processing proceeds to step S55. In step S54, depth metadata of the point of interest obtained through the face detection, stored in step S14 of FIG. 4, is acquired to proceed to step S56. Alternatively, in step S55, depth metadata is acquired with the in-focus point stored in step S14 of FIG. 3B as a point of interest, to proceed to step S56.

In step S56, the left text generation circuit 125 and the right text generation circuit 126 generate, on the basis of the acquired depth metadata of the point of interest, left and right texts with parallax corresponding to the depth, respectively. Then, the left superimposition circuit 127 and the right superimposition circuit 128 respectively superimpose the left text and the right text on the left image and the right image (step S57), and then the processing is ended.

Figure 7A:
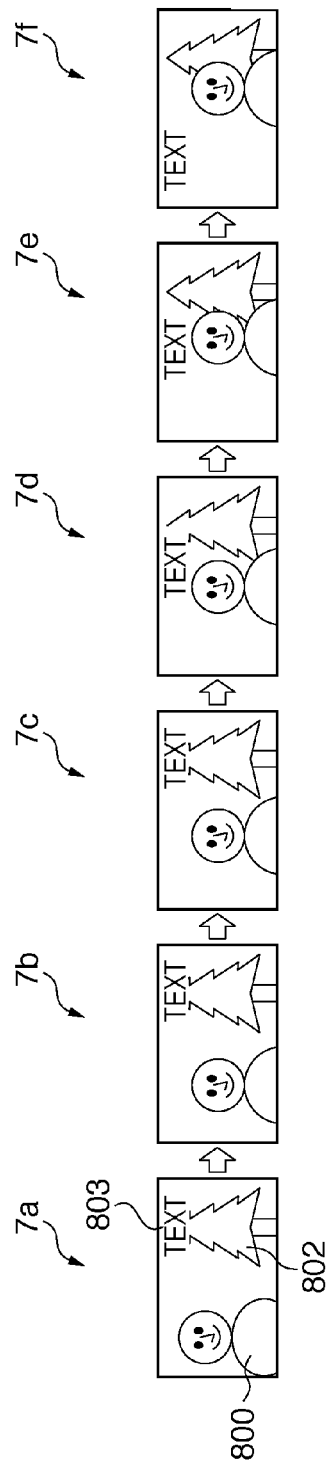
FIGS. 7A and 7B are diagrams illustrating an example of displaying a stereoscopic image in the first embodiment of the present invention.
Figure 7B:
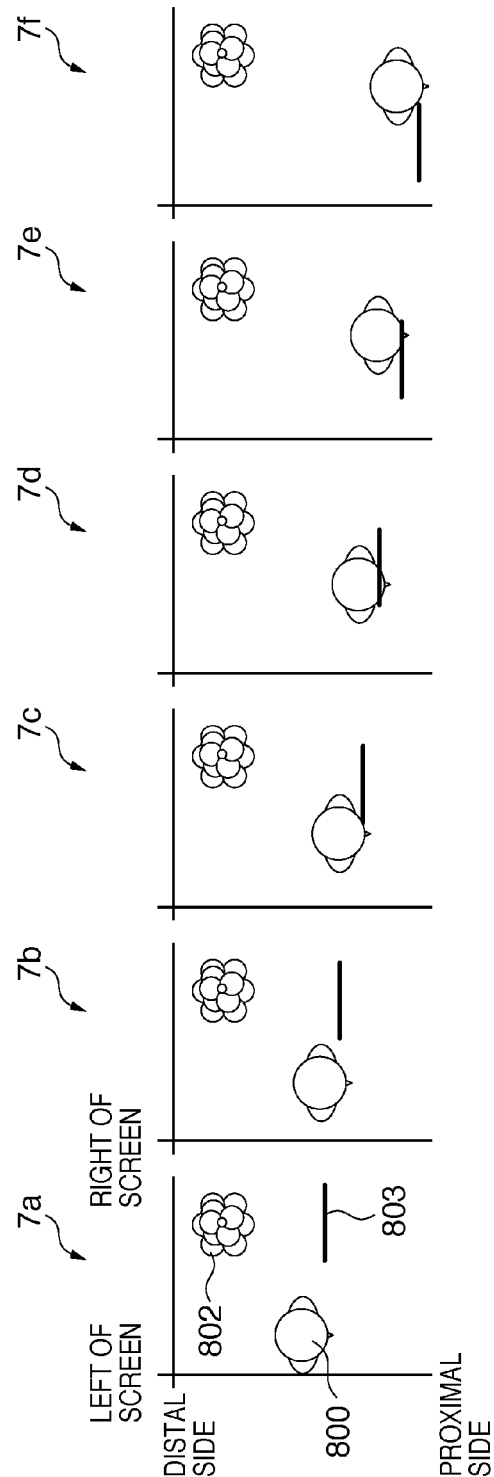

FIGS. 7A and 7B are diagrams illustrating an example of transition of a stereoscopic image displayed in the case of repeating the operation described with reference to the flowchart in FIG. 6, in a case in which the first pattern is selected by the text movement pattern selection key 122. As described above, the first pattern refers to a pattern in which a text is always displayed at the same depth as the depth of the point of interest.

FIG. 7A shows a left image or a right image with a text superimposed thereon, which is displayed on the display apparatus 129, whereas FIG. 7B shows the concept of the depth for the image displayed in FIG. 7A. In addition, a subject 800 of a person and a subject 802 of a tree appear in FIGS. 7A and 7B, and depth metadata with the face of the subject 800 as a point of interest is to be acquired in accordance with any of step S52 (line-of-sight detection), step S54 (in-focus point), and step S55 (face detection) of FIG. 6.

In the example shown in FIGS. 7A and 7B, the subject 800 is moving to the front as shown in images 7*a* to 7*f*. Therefore, on the basis of metadata of the depth of the point of interest associated with each of the images 7*a* to 7*f*, a text 803 is displayed at the same depth as that of the subject 800 as shown in FIG. 7B.

Figure 8A:
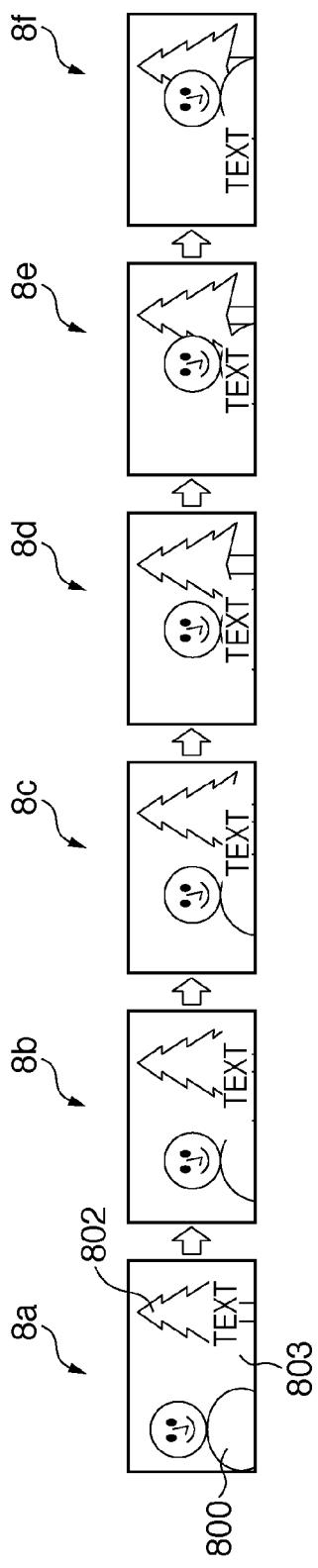
FIGS. 8A and 8B are diagrams illustrating another example of displaying a stereoscopic image in the first embodiment of the present invention.
Figure 8B:
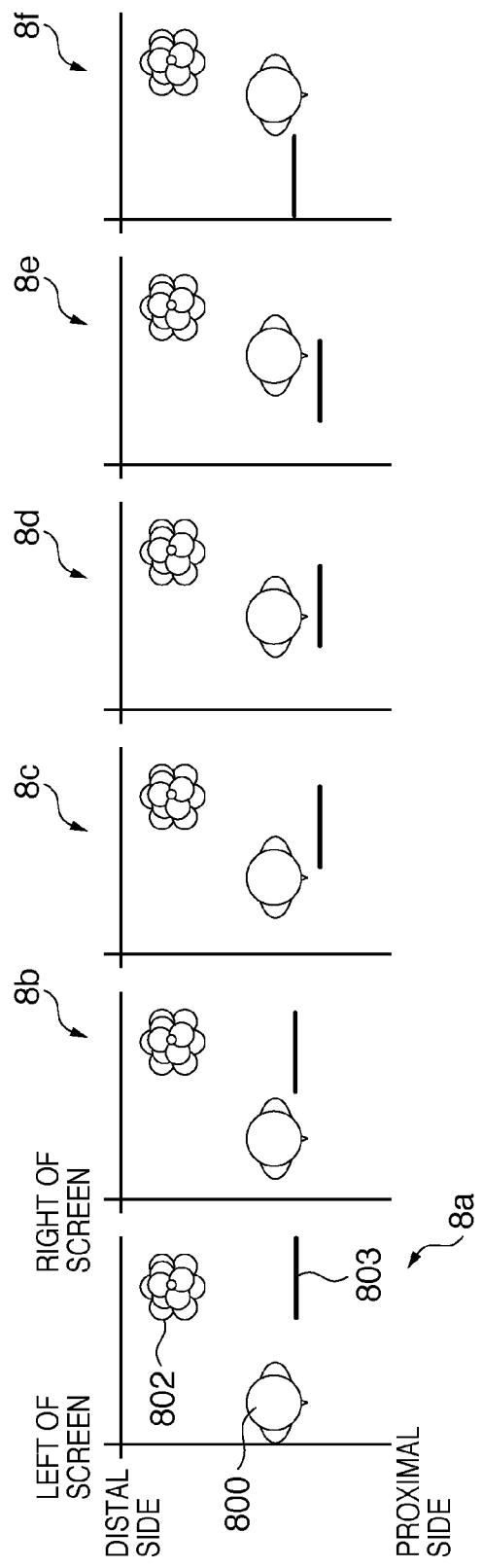

FIGS. 8A and 8B are diagrams illustrating an example of transition of a stereoscopic image displayed in the case of repeating the operation described with reference to the flowchart in FIG. 6, in a case in which the second pattern is selected by the text movement pattern selection key 122. As described above, the second pattern refers to a pattern in which a text is displayed at a depth in front of a subject in a case in which the lateral display point of the text on the screen is the same as the lateral display point of the subject at the point of interest on the screen.

FIG. 8A shows a left image or a right image with a text superimposed thereon, which is displayed on the display apparatus 129, whereas FIG. 8B shows the concept of the depth for the image displayed in FIG. 8A. This example shows a case in which a subject 800 is moving from left to right in the screen at the same depth whereas a text 803 is reversely moving from right to left in the screen, as shown in images 8*a* to 8*f* in FIGS. 8A and 8B. Further, in a case in which the text 803 and the subject 800 are located in the same horizontal point on the screen, the text 803 is displayed at a depth in front of the subject 800, as shown in images 8*c* to 8*e* in FIG. 8B. On the other hand, in a case in which the text 803 and the subject 800 are located in different horizontal points, the text 803 is displayed on the same depth as that of the subject 800, as shown in images 8*a*, 8*b*, and 8*f* in FIG. 8B. Thus, this pattern is a pattern for avoiding and going around the same depth.

FIGS. 9A and 9B are diagrams illustrating an example of transition of a stereoscopic image displayed in the case of repeating the operation described with reference to the flowchart in FIG. 6, in a case in which the third pattern is selected by the text movement pattern selection key 122. As described above, the third pattern refers to a pattern in which a text is displayed at the same depth as that of a subject only in a case in which the lateral display point of the text on the screen is the same as the lateral display point of the subject at the point of interest.

FIG. 9A shows a left image or a right image with a text superimposed thereon, which is displayed on the display apparatus 129, whereas FIG. 9B shows the concept of the depth for the image displayed in FIG. 9A. This example shows a case in which a subject 800 is moving from left to right in the screen at the same depth whereas a text 803 is reversely moving from right to left in the screen, as shown in images 9a to 9f in FIGS. 9A and 9B. Further, in a case in which the text 803 and the subject 800 are located in the same horizontal point on the screen, the text 803 is displayed at the same depth as that of the subject 800, as shown in images 9c to 9e in FIG. 9B. On the other hand, in a case in which the text 803 and the subject 800 are located in different horizontal points, the text 803 is displayed at a different depth from that of the subject 800, as shown in images 9a, 9b, and 9f in FIG. 9B.

As described above, according to the first embodiment of the present invention, the point of interest is determined during shooting, then depth information on the point of interest is obtained, and the depth information is recorded on the recording medium along with image data of a shot stereoscopic image. Then, during reproduction, the depth information on the point of interest is acquired along with the image data from the recording medium, and when a text is superimposed on a stereoscopic image, right and left texts with parallax are generated on the basis of the acquired depth information on the point of interest, and respectively superimposed on right and left images. The display control as described above allows texts to be displayed at an easily viewable depth of a stereoscopic image. Further, while an example of synthesizing a text on a reproduced stereoscopic image has been described in the first embodiment of the present invention, a caption, an icon, a computer graphic (CG) image, other image or mark, or the like may be synthesized on the basis of the depth information on the point of interest.

It is to be noted that while a case of recording all of the depths of the line-of-sight detection point, the focus point, and the face detection point in the image capturing apparatus has been described in the first embodiment, the present invention is not to be considered limited to this case, and at least one of these points may be recorded. In that case, in the processing in FIG. 6, the recorded depth may be checked with the viewer, among the depths of the line-of-sight detection point, the focus point, and the face detection point.

Second Embodiment

Next, a second embodiment of the present invention will be described. In the first embodiment described above, a point of interest is obtained during shooting, and the depth information on the point of interest is recorded as metadata of the stereoscopic image and used for text display during reproduction. In contrast, in the second embodiment, a point of interest obtained during shooting is recorded as metadata of a stereoscopic image, the depth of the point of interest is obtained in an image reproducing apparatus side, and a text is displayed at the depth. It is to be noted that an image capturing apparatus and an image reproducing apparatus in the second embodiment respectively have the same configurations as those described with reference to FIGS. 1 and 5, and descriptions of the image capturing apparatus and the image reproducing apparatus will be thus omitted.

Figure 10A:
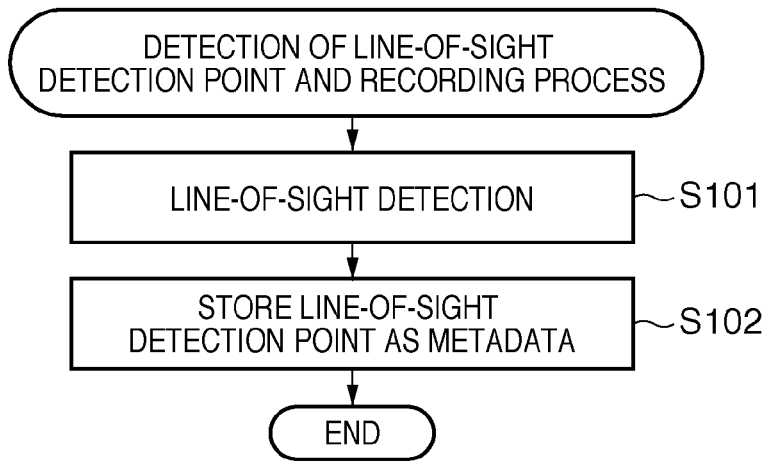
FIGS. 10A to 10C are flowcharts for detection of a point of interest and processing for recording in a second embodiment of the present invention.

FIG. 10A is a flowchart showing processing for recording, as camera information for reference of a point of interest, a line-of-sight detection point obtained with the use of the photographer line-of-sight detection apparatus 110 in the second embodiment. In FIG. 10A, the photographer line-of-sight detection apparatus 110 detects the line of sight of the photographer looking into the 2D view finder 109 (step S101), information on the detected photographer line-of-sight detection point is recorded on the recording medium 107 as metadata associated with image signals (step S102), and then the processing is ended.

In the processing shown in FIG. 10A, the point gazed by the photographer is recorded through the line-of-sight detection. Thus, as described below, texts can also be inserted during reproduction at the depth of a subject gazed by the photographer, thereby allowing for easily viewable display.

Figure 10B:
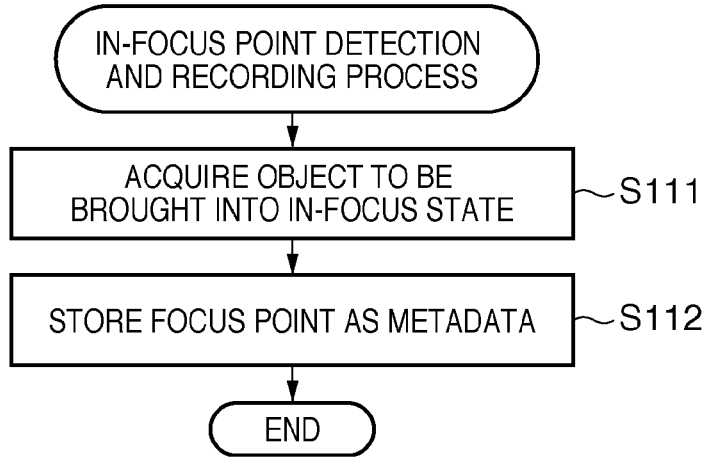

FIG. 10B is a flowchart showing processing for recording, as camera information for reference of a point of interest, an in-focus point in the second embodiment. In FIG. 10B, the focus point of a lens is obtained from focus information output from the focus control circuit 103 (step S111), information on the obtained focus point is recorded on the recording medium 107 as metadata associated with image signals (step S112), and then the processing is ended.

In the processing shown in FIG. 10B, for example, in such a situation as shooting an observation video, the focus point is stored in a case in which the composition is determined so that a main subject is brought into the in-focus point in an autofocus mode or in which shooting is carried out with a main subject as an object to be brought into an in-focus state in a manual focus mode. Therefore, as described below, texts can also be inserted during reproduction at the depth of a subject in an in-focus state, thereby allowing for easily viewable display.

It is to be noted that while the information on the object to be brought into an in-focus state is recorded in FIG. 10B, distance information (distance map) for each screen point may be recorded which is output from a distance sensor for AF (not shown).

Figure 10C:
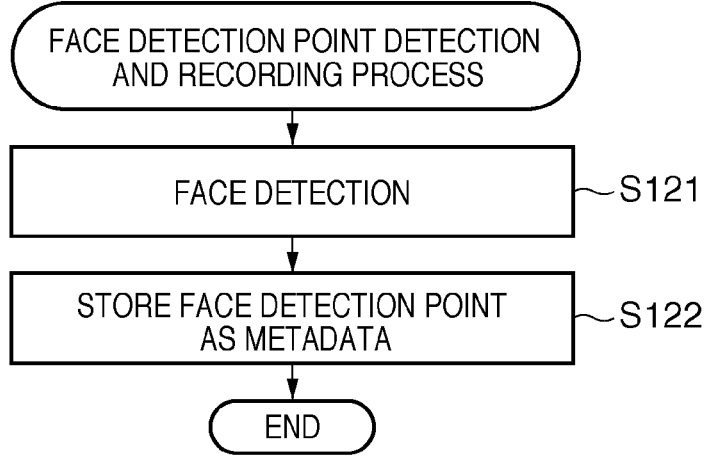

FIG. 10C is a flowchart showing processing for recording, as camera information for reference of a point of interest, a face detection point obtained by the face detection unit 108 in the second embodiment. In FIG. 10C, first, the face detection unit 108 carries out face detection (step S121), information on the detected face detection point is recorded on the recording medium 107 as metadata associated with image signals (step S122), and then the processing is ended.

It is to be noted that in a case in which there are multiple faces in the screen, it may be checked with the photographer if a detected face is a main subject desired by the photographer or not, as in step S32 of FIG. 4.

Furthermore, in a case in which multiple faces are detected, information on the multiple face detection positions may be recorded.

Figure 11A:
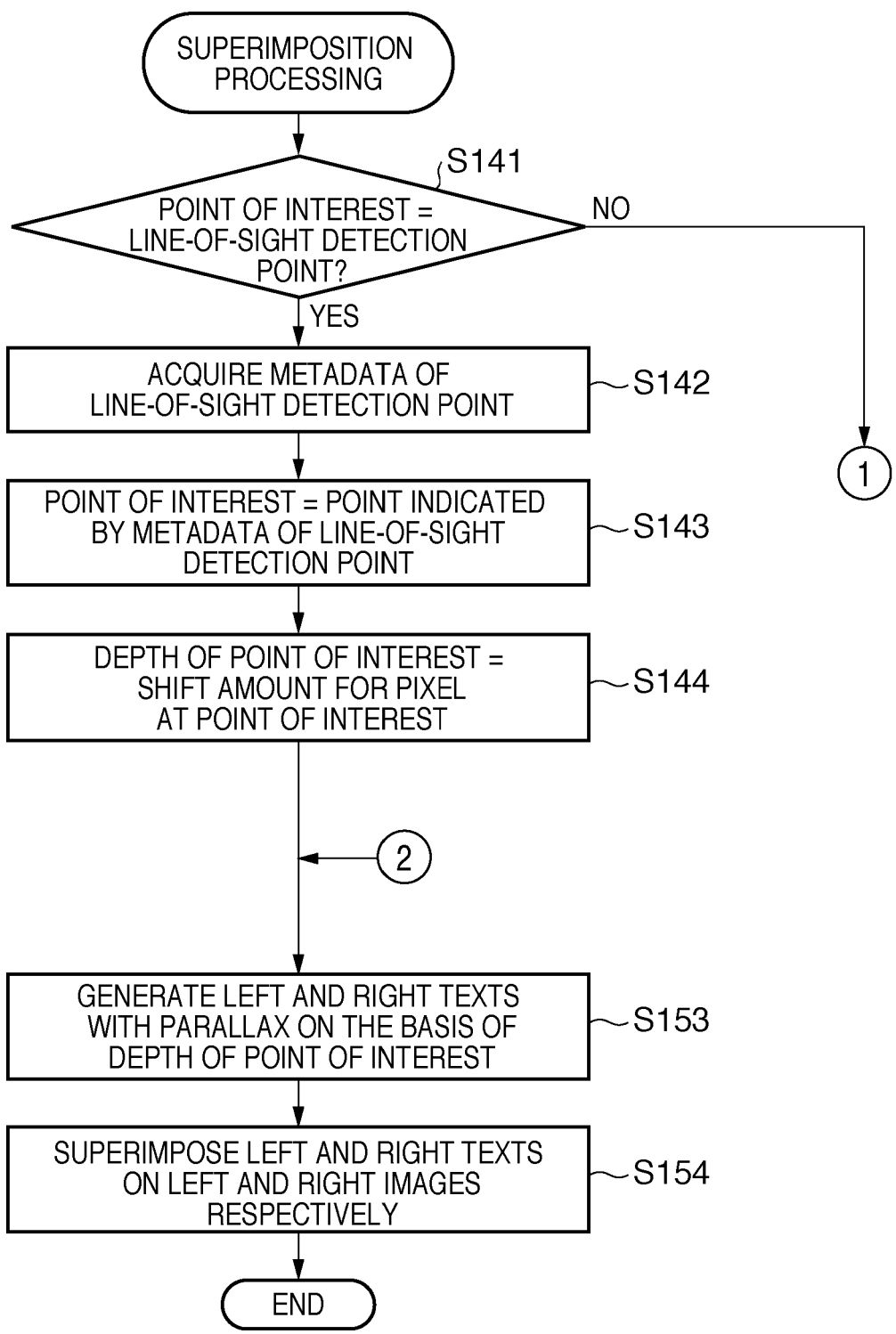
FIGS. 11A and 11B are flowcharts showing text superimposition processing in the second embodiment of the present invention.
Figure 11B:
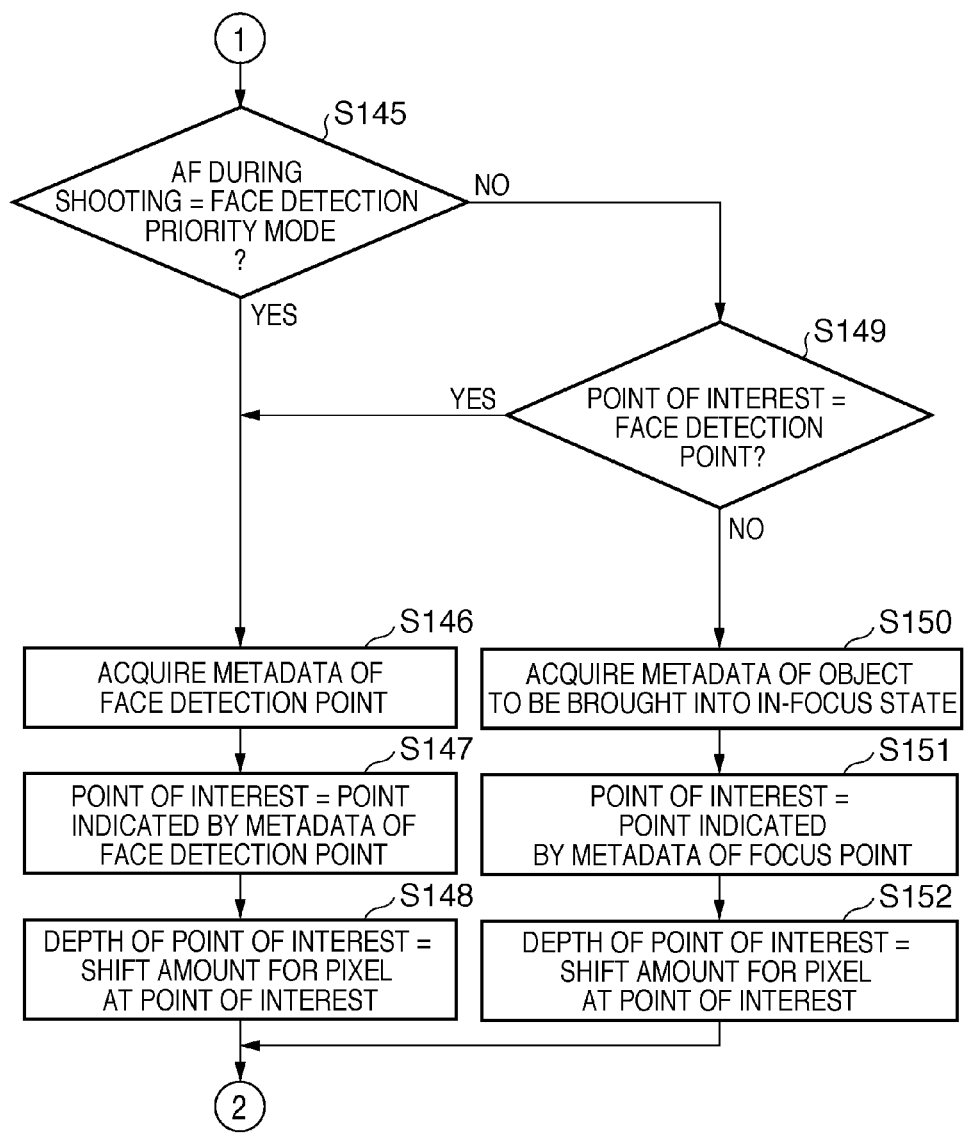

FIGS. 11A and 11B are flowcharts showing text superimposition processing in the image reproducing apparatus according to the second embodiment.

First, it is checked with the viewer if a line-of sight point during shooting is regarded as a point of interest or not (step S141), and if the line-of-sight detection point is regarded as a point of interest, the processing proceeds to step S142, or if not, the processing proceeds to step S145. In step S142, metadata of the line-of-sight detection point, stored in step S102 of FIG. 10A, is acquired to proceed to step S143, and the point indicated by the acquired metadata of the line-of-sight detection point is determined as a point of interest to proceed to step S144. In step S144, on the basis of this point of interest, the image shift detection circuit 130 for detecting the shift between the left image and the right image detects the shift amount for the pixel at the point of interest as the depth of the point of interest, as described in FIGS. 2A and 2B, and the processing proceeds to step S153.

On the other hand, it is determined in step S145 if the autofocus mode during shooting is a face detection priority mode or a normal AF priority mode, and if the autofocus mode is a face detection priority mode, the processing proceeds to step S146, or If not, the processing proceeds to step S149. The face detection priority mode herein refers to a mode in which the point at which a face is detected is preferentially regarded as an object to be brought into an in-focus state, whereas the normal AF priority mode refers to a mode in which a fixed point such as a center focus of point is regarded as an object to be brought into an in-focus state. In step S146, the metadata of the face detection point, which has been stored in step S122 of FIG. 10C, is acquired to proceed to step S147, and the point indicated by the acquired metadata of the face detection point is determined as a point of interest to proceed to step S148. In step S148, on the basis of the point of interest, the image shift detection circuit 130 for detecting the shift between the left image and the right image detects the shift amount for the pixel at the point of interest as the depth of the shift amount, as described in FIGS. 2A and 2B, and the processing proceeds to step S153.

Furthermore, in step S149, it is checked with viewer if a face detection point during shooting is regarded as a point of interest or not, and if the face detection point is regarded as a point of interest, the processing proceeds to step S146 described above, in which the processing described above is carried out. If not, the processing proceeds to step S150, in which the metadata of the focus point, which has been stored in step S112 of FIG. 10B, is acquired to proceed to step S151, and the point indicated by the acquired metadata of the focus point is determined as a point of interest to proceed to step S152. In step S153, on the basis of the point of interest, the image shift detection circuit 130 for detecting the shift between the left image and the right image detects the shift amount for the pixel at the point of interest as the depth of the point of interest, as described in FIGS. 2A and 2B, and the processing proceeds to step S153.

In step S153, a left text generation circuit 125 and a right text generation circuit 126 respectively generate left and right texts with parallax corresponding to the depth on the basis of the depth of the detected point of interest. Then, a left superimposition circuit 127 superimposes the left text on the left image whereas a right superimposition circuit 128 superimposes the right text on the right image (step S154), and then the processing is ended.

As described above, according to the second embodiment of the present invention, the line-of-sight point, the focus point, and the face detection point are obtained during shooting, and the points are recorded as metadata on the recording medium along with image data of a shot stereoscopic image. Then, during reproduction, the metadata is reproduced along with the image data from the recording medium, and any of the line-of-sight point, focus point, and face detection point is acquired. When a text is superimposed on a stereoscopic image, the depth is obtained with any of the acquired line-of-sight point, focus point, and face detection point as a point of interest, and right and left texts with parallax are generated on the basis of the obtained depth, and respectively superimposed on right and left images. The display control as described above allows texts to be displayed at an easily viewable depth of a stereoscopic image.

It is to be noted that while a case of recording all of the line-of-sight detection point, the focus point, and the face detection point in the image capturing apparatus has been described in the second embodiment, the present invention is not to be considered limited to this case, and at least one of these points may be recorded. In that case, in the processing in FIGS. 11A and 11B, the recorded depth may be checked with the viewer among the depths of the line-of-sight detection point, the focus point, and the face detection point. In addition, while an example of synthesizing a text on a reproduced stereoscopic image has been described in the second embodiment of the present invention, a caption, an icon, a computer graphic (CG), other image or mark, or the like may be synthesized.

Third Embodiment

Next, a third embodiment of the present invention will be described. In the first and second embodiments described above, the cases have been described in which the depth of a point of interest is or the line-of-sight detection point, focus point, and face detection point are detected during shooting, and recorded with an image, and a text is displayed with the use of the information during reproduction. In contrast, in the third embodiment, a point of interest and the depth thereof are obtained during reproduction in an image reproducing apparatus, and a text is displayed at the depth. It is to be noted that an image capturing apparatus and an image reproducing apparatus in the third embodiment respectively have the same configurations as those described with reference to FIGS. 1 and 5, and descriptions of the image capturing apparatus and the image reproducing apparatus will be thus omitted.

Figure 12A:
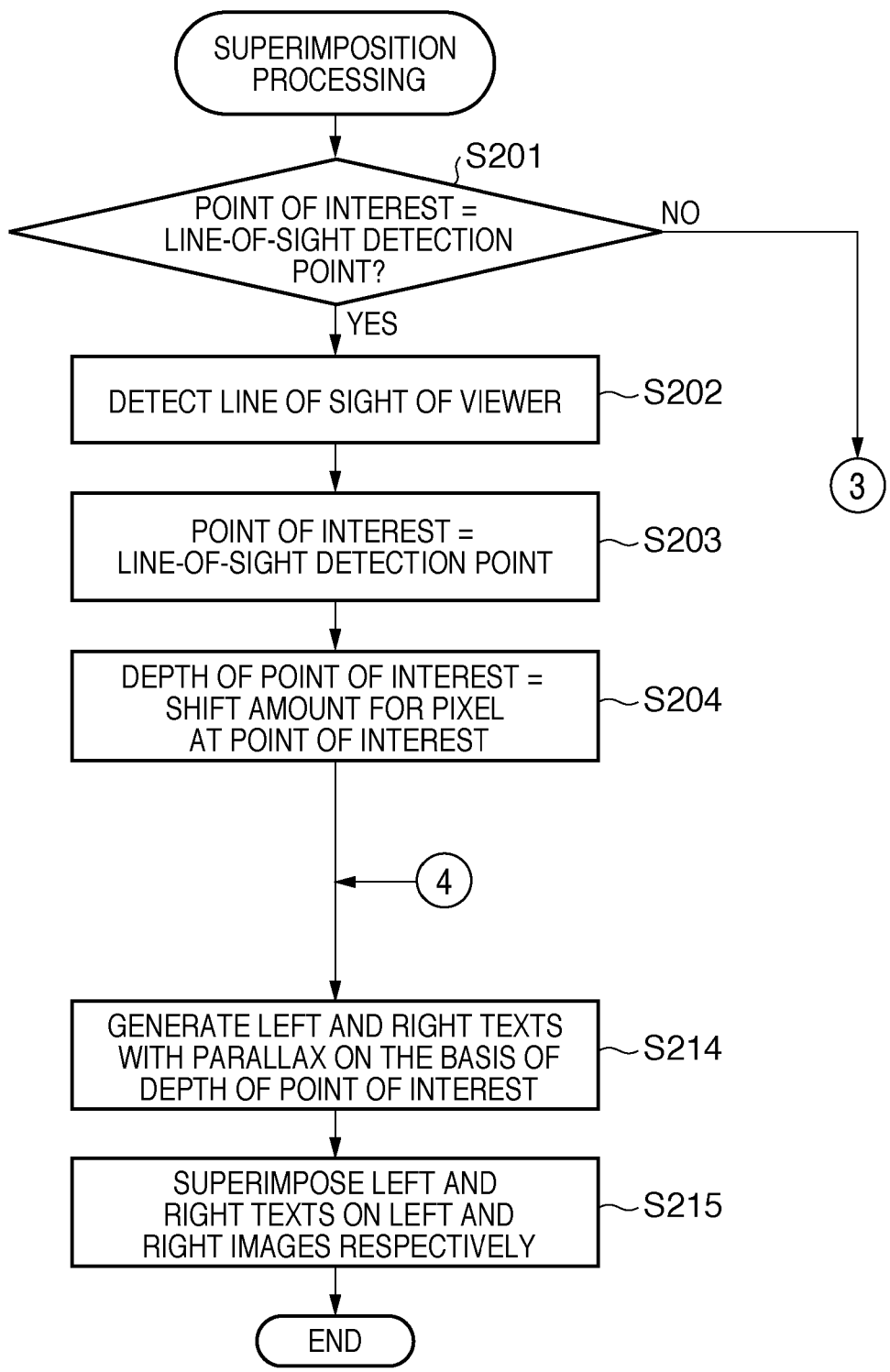
FIGS. 12A and 12B are flowcharts showing text superimposition processing in a third embodiment of the present invention.
Figure 12B:
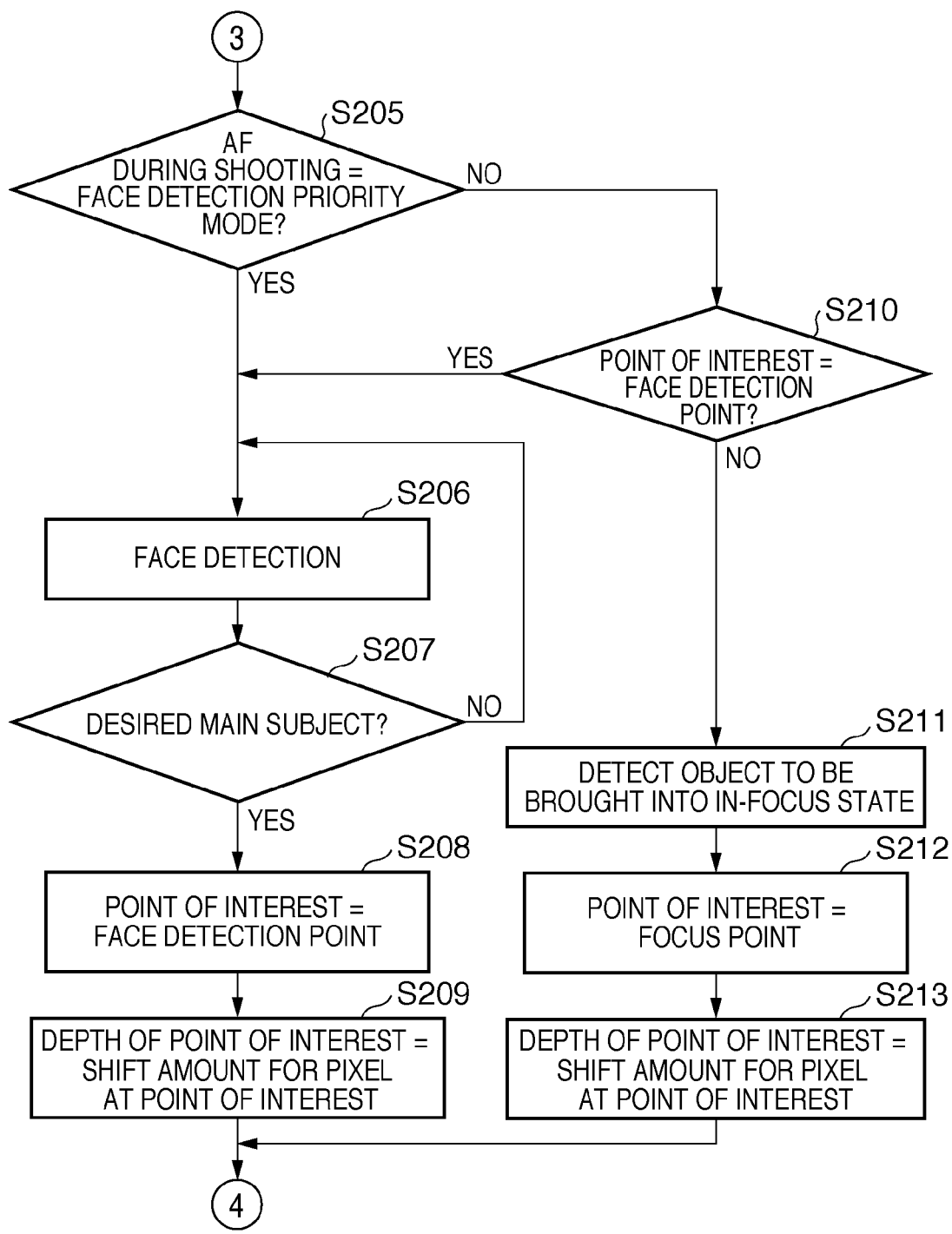

FIGS. 12A and 12B are flowcharts showing text superimposition processing in the image reproducing apparatus according to the third embodiment.

First, it is checked with the viewer if a line-of sight of the viewer is regarded as a point of interest or not (step S201), and if the line-of-sight detection point is regarded as a point of interest, the processing proceeds to step S202, or if not, the processing proceeds to step S205. In step S202, the viewer line-of-sight detection apparatus 123 detects a point of the display apparatus 129 gazed by the viewer, and the destination of the detected line of sight is regarded as a point of interest (step S203). Then, the image shift detection circuit 130 for detecting the shift between the left image and the right image detects the shift amount for the pixel at the point of interest as the depth of the point of interest (step S204), as described in FIGS. 2A and 2B, and the processing proceeds to step S214.

On the other hand, it is determined in step S205 if the autofocus mode during shooting is a face detection priority mode or a normal AF priority mode, and if the autofocus mode is a face detection priority mode, the processing proceeds to step S206, or If not, the processing proceeds to step S210. In step S206, the face detection unit 140 carries out face detection, and from the obtained face detection information, the CPU 124 checks with the viewer if the detected face is a desired main subject or not (step S207). If the detected face is not the desired main subject, the processing is returned to step S206 to repeat the face detection. This operation allows the viewer to repeat the selection until the desired main subject is detected. Alternatively, if the detected face is the desired main subject, the face detection point based on the face detection information is regarded as a point of interest (step S208). Then, on the basis of the detected point of interest, the depth of the point of interest is detected in the same way as in step S204 (step S209), and the processing proceeds to step S214.

Furthermore, in step S210, it is checked with the viewer if the point of a face detected from a reproduced image is regarded as a point of interest or not, and if the point of the detected face is regarded as a point of interest, the processing proceeds to step S206 described above, in which the processing described above is carried out. If not, the processing proceeds to step S211, in which an object to be brought into an in-focus state is detected by a method described below (step S211), and the detected focus point is regarded as a point of interest (step S212). Then, on the basis of the detected point of interest, the depth of the point of interest is detected in the same way as in step S204 (step S213), and the processing proceeds to step S214.

In step S214, the left text generation circuit 125 and the right text generation circuit 126 generate, on the basis of the depth of the point of interest obtained in any of step S204, S209, and S213, left and right texts with parallax corresponding to the depth, respectively. Then, the left superimposition circuit 127 and the right superimposition circuit 128 respectively superimpose the left text and the right text on the left image and the right image (step S215), and then the processing is ended.

Figure 13A:
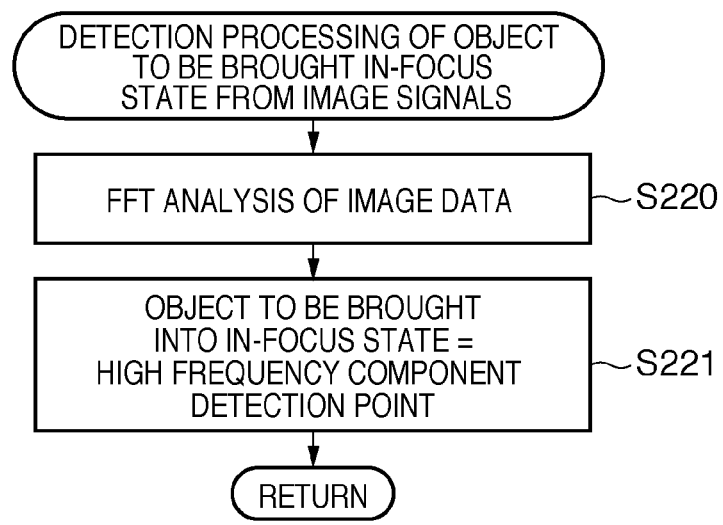
FIGS. 13A and 13B are flowcharts for in-focus point detection processing in the third embodiment of the present invention.

FIG. 13A is a flowchart showing an example of processing for detecting an object to be brought into an in-focus state from image signals during reproduction, which is carried out in step S211 of FIG. 12B.

In step S220, image data is subjected to a FFT (fast Fourier transform) analysis to proceed to step S221. In step S221, the vicinity of the image acquired as the detection point of an edged high frequency component of the image is regarded as object to be brought into an in-focus state to proceed to step S212 of FIG. 12B.

Figure 13B:
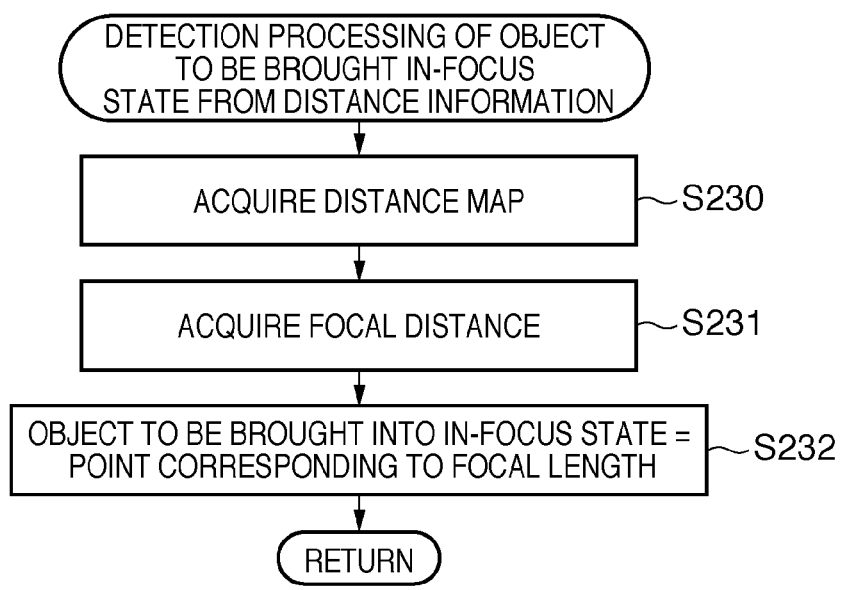

FIG. 13B is a flowchart showing another example of processing for detecting an object to be brought into an in-focus state from image signals during reproduction, which is carried out in step S211 of FIG. 12B.

In step S230, a distance map stored along with an image during shooting is acquired to proceed to step S231, in which the focal length for the shooting is acquired. Then, in step S232, the screen point corresponding to the focal length for the shooting is searched from the distance map, and regarded as an object to be brought into an in-focus state, and then the processing is ended.

Figures 14A, 14B:
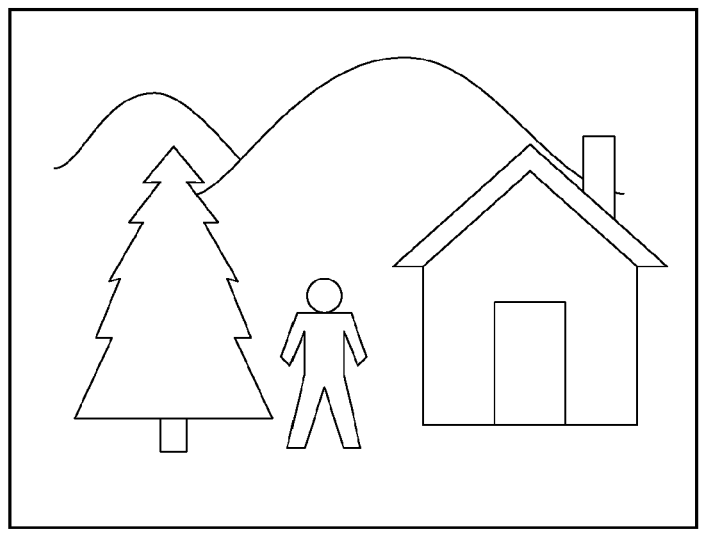
FIGS. 14A and 14B are diagrams for explaining a distance map in the third embodiment of the present invention.

FIGS. 14A and 14B are image diagrams for explaining the distance map as information associated with the image data as described with reference to FIG. 13B. FIG. 14A is an image diagram for an image, whereas FIG. 14B is an image diagram for the corresponding distance map, in which distances corresponding to the screen points are recorded, in this figure, the values of the distances are recorded such as a value 100 for infinity, a value 10 for a house, a value 5 for a tree, and a value 3 for a person.

As described above, the third embodiment of the present invention allows texts to be displayed at an easily viewable depth of a stereoscopic image, even when no information is recorded regarding the point of interest, etc. during shooting.

It is to be noted that while the superimposition of a text on a reproduced stereoscopic image has been described in the third embodiment of the present invention, a caption, an icon, a computer graphic (CG), other image or mark, or the like may be synthesized.

Furthermore, while cases of detecting the face of a person as a main subject have been described in the first to third embodiments, the present invention is not to be considered limited to these cases, a predetermined subject such as, for example, a car or a pet may be detected.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-152876, filed on Jun. 26, 2009 which is hereby incorporated by reference herein in its entirety.

What is claimed is:

1. An image display apparatus comprising:
   an obtaining unit that obtains a stereoscopic image data; and
   a controller that displays a stereoscopic image relating to the stereoscopic image data onto a display apparatus;
   wherein the controller displays a second image which is different from the stereoscopic image onto the display apparatus, and
   wherein the controller determines a focused area of the stereoscopic image when the stereoscopic image is shot, and displays the second image at a depth relating to a depth of the focused area when the stereoscopic image is shot.

2. The image display apparatus according to claim 1, therein the controller displays the second image at a depth of the focused area in the stereoscopic image.

3. The image display apparatus according to claim 1, wherein the controller obtains additional information which is indicative of the depth of the focused area in the stereoscopic image.

4. The image display apparatus according to claim 3, wherein the obtaining unit obtains the stereoscopic image data from a recording medium, and
   wherein the additional information is recorded on the recording medium.

5. A method for controlling an image display apparatus comprising:
   an obtaining step of obtaining a stereoscopic image data; and
   a displaying step of displaying a stereoscopic image relating to the stereoscopic image data onto a display apparatus;
   wherein the displaying step displays a second image which is different from the stereoscopic image onto the display apparatus, and
   wherein the displaying step determines a focused area of the stereoscopic image when the stereoscopic image is shot, and displays the second image at a depth relating to a depth of the focused area when the stereoscopic image is shot.

6. A non-transitory computer-readable storage medium having stored thereon a computer program which is executable by an image processing apparatus, the program having a computer program code for executing the method according to claim 5.

* * * * *